US012649874B2

(12) United States Patent
Yun et al.

(10) Patent No.: US 12,649,874 B2
(45) Date of Patent: Jun. 9, 2026

(54) HYDROGEN SWELLABLE FILLERS FOR SURFACE AND UNDERGROUND FLUID ISOLATION BARRIERS

(71) Applicant: Schlumberger Technology Corporation, Sugar Land, TX (US)

(72) Inventors: Jushik Yun, Sugar Land, TX (US); Manuel Marya, Rosharon, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/141,342

(22) PCT Filed: Dec. 27, 2023

(86) PCT No.: PCT/US2023/086002
§ 371 (c)(1),
(2) Date: Jun. 20, 2025

(87) PCT Pub. No.: WO2024/145338
PCT Pub. Date: Jul. 4, 2024

(65) Prior Publication Data

US 2026/0042951 A1 Feb. 12, 2026

Related U.S. Application Data

(60) Provisional application No. 63/477,981, filed on Dec. 30, 2022.

(51) Int. Cl.

| | |
|---|---|
| ***E21B 33/127*** | (2006.01) |
| ***C01B 3/0078*** | (2026.01) |
| ***C09K 8/50*** | (2006.01) |

(52) U.S. Cl.
CPC .............. *C09K 8/50* (2013.01); *C01B 3/0078* (2013.01); *E21B 33/127* (2013.01)

(58) Field of Classification Search
CPC ..... C08L 2666/52; C08L 101/14; C09K 8/50; E21B 33/127
See application file for complete search history.

(56) References Cited

U.S. PATENT DOCUMENTS

| | | | | |
|---|---|---|---|---|
| 10,604,693 | B2 | 3/2020 | Kim | |
| 10,851,284 | B2 * | 12/2020 | Sherman | E21B 49/006 |

(Continued)

FOREIGN PATENT DOCUMENTS

| | | | |
|---|---|---|---|
| CN | 102532634 | A | 7/2012 |
| EP | 3584297 | B1 | 9/2022 |

OTHER PUBLICATIONS

International Search Report and Written Opinion of International Patent Application No. PCT/US2023/086002 dated on May 7, 2024, 08 pages.

*Primary Examiner* — Cathleen R Hutchins
(74) *Attorney, Agent, or Firm* — Kyle R. Miiller

(57) ABSTRACT

The present disclosure relates to hydrogen swellable fillers, methods for their preparation and their use in, for example, oil-field exploration, production, testing, underground gas storage, production and transportation. The hydrogen swellable material can include an elastomer and a filler. The elastomer can have a hardness between about 40 and about 80 shore A, and the hydrogen swellable material swells in volume between about 40% and about 100% upon contact with hydrogen.

19 Claims, 5 Drawing Sheets

(56) References Cited

U.S. PATENT DOCUMENTS

| | | | | |
|---|---|---|---|---|
| 2007/0027245 | A1* | 2/2007 | Vaidya | C08C 19/00<br>524/424 |
| 2008/0125335 | A1* | 5/2008 | Bhavsar | B82Y 15/00<br>166/243 |
| 2008/0207832 | A1* | 8/2008 | Worley | C08L 53/025<br>525/88 |
| 2009/0084550 | A1* | 4/2009 | Korte | C08L 33/00<br>524/35 |
| 2010/0147507 | A1* | 6/2010 | Korte | E21B 33/1208<br>523/130 |
| 2013/0126190 | A1* | 5/2013 | Mazyar | E21B 33/1208<br>166/387 |
| 2014/0110114 | A1 | 4/2014 | Daou | |
| 2015/0299438 | A1 | 10/2015 | Choi | |
| 2017/0015824 | A1* | 1/2017 | Gozalo | C08L 33/18 |

* cited by examiner

Elastomer Swelling by Hydrogen after Pressure Cycles Per ISO 23936-2 RGD
Test Condition, (100 C, 2175 psi and Release 290 psi/min with Full Scale Eight Cycles)

☑ Original
☑ <1hr After Bleeding
☐ <24hr After Bleeding

Volume Swelling %

40.0   35.0   30.0   25.0   20.0   15.0   10.0   5.0   0.0

Silicone       Buna-N       Neoprene       Viton       PU 80A       EPDM       Neoprene       Buna-N       Buna-N
70A Bead    70A Bead    70A Bead    70A Bead    Bead    Strip 60A    Strip 50A    Strip 60A    Strip 40A Elastomer Types

HYDROGEN SWELLABLE FILLERS FOR SURFACE AND UNDERGROUND FLUID ISOLATION BARRIERS

CROSS REFERENCE

This application is a National Stage Entry of International Application No. PCT/US2023/086002, filed on Dec. 27, 2023, which claims the benefit under 35 U.S.C. § 119(e) of U.S. Provisional Patent Application No. 63/477,981, filed on Dec. 30, 2022 which is incorporated herein by reference, in its entirety.

FIELD OF THE INVENTION

The present invention relates to hydrogen swellable fillers and their use in, for example, oil-field exploration, production, testing, underground gas storage, production and transportation.

BACKGROUND OF THE INVENTION

Hydrocarbon fluids such as oil and natural gas are obtained from a subterranean geological formation, referred to as a reservoir, by drilling a well that penetrates the hydrocarbon-bearing formation. Once a wellbore has been drilled, the well must be completed before hydrocarbons can be produced from the well. A completion involves the design, selection, and installation of equipment and materials in or around the wellbore for conveying, pumping, or controlling the production or injection of fluids. After the well has been completed, production of oil and gas can begin.

Well pipe such as coiled or threaded production tubing, for example, is surrounded by an annular space between the exterior wall of the tubing and the interior wall of the casing or borehole wall. Frequently, it is necessary to seal this annular space between upper and lower portions of the well depth. It is often desired to utilize packers to form an annular seal in wellbores. Open-hole packers provide an annular seal between the earthen sidewall of the wellbore and a tubular. Cased-hole packers provide an annular seal between an outer tubular and an inner tubular. The sealing element of a packer is a ring of rubber or other elastomer that is secured and sealed to the interior wall surface which may be the interior casing wall or the borehole wall. By compression, for example, the ring of rubber is expanded radially against the casing or borehole wall.

Common types of packers include inflatable packers, mechanical expandable packers, and swell packers. Swell packers comprise a sealing material that increases in volume and expands radially outward when a particular fluid contacts and diffuses into the sealing material in the well. The sealing material swells in response to exposure to a hydrocarbon fluid or to exposure to water in the well.

U.S. Pat. Nos. 8,490,707 and 10,604,693 disclose swellable elastomers designed to swell in the presence of fluids in a wellbore, such as water, oil or brine.

However, sealing materials designed to swell in the presence of fluids such as water and hydrocarbons are not suitable for swelling in the presence of hydrogen, due to the hardness of the material being too high (typically 80 Shore A or greater) and/or the presence of too high a content of reinforcing filler.

With the growing demand for storing hydrogen, particularly underground, there is a foreseeable need for advanced materials that are not only long-term compatible with hydrogen, but also have additional functions, including hydrogen-induced swelling. With hydrogen being an essential component for green energy and sustainability, it is foreseeable that hydrogen transport and storage will require several critical technologies, including hydrogen swellable elastomers. The present invention addresses such needs.

SUMMARY OF THE INVENTION

The present invention relates to hydrogen swellable materials. Such hydrogen swellable materials may be useful, for example, for sealing and zone isolation purposes, in, for example, packers, seals, coatings, cracked and/or corroded metallics, cracked or corroded tubulars, metal-polymer composition parts, self-sealing cements, and other materials intentionally built with a permeable structure in need to be filled. The hydrogen swellable materials may also be useful as a sealing element part of a tool (e.g., a downhole tool), such as, e.g., a plurality of tools, wherein one tool is geared toward hydrogen and another tool is geared towards other fluids (e.g., water, oil). Hydrogen may be injected into wells for temporary storage purposes, or alternatively naturally produced from specific reservoirs.

In one aspect the present invention relates to a hydrogen swellable material comprising:

(i) an elastomer; and (ii) a filler;

wherein the elastomer has a hardness between about 40 shore A and about 80 shore A, and wherein the hydrogen swellable material swells in volume between about 40% and about 100% (such as between about 70% and about 100%) upon contact with hydrogen.

In another aspect, the present invention relates to a sealing system (e.g., a sealing system for use in subterranean wellbores) comprising a hydrogen swellable material according to any of the embodiments described herein.

In another aspect, the present invention relates to a method for forming a seal (e.g., a seal in a wellbore, such as an open hole wellbore), the method comprising:

(i) providing a hydrogen swellable material according to any of the embodiments described herein;

(ii) deploying the hydrogen swellable material into a wellbore and, optionally, exposing the hydrogen swellable material to a triggering condition, thereby forming a seal in the wellbore.

In one embodiment, the seal isolates a particular wellbore zone from another wellbore zone or region of a subterranean formation.

In one embodiment, the seal formed is an O-ring, a packer element, a bonded seal, a flow control valve or a bridge plug.

In another aspect, the present invention relates to a cement (such as a self-healing cement) comprising a hydrogen swellable material according to any of the embodiments described herein.

In another aspect, the present invention relates to a tool (such as a downhole tool that would benefit from an elastomer swelling (expanding) in the presence of hydrogen) comprising a hydrogen swellable material according to any of the embodiments described herein. In an embodiment, the tool may be a packer element, a bridge plug, or a liner hanger.

DETAILED DESCRIPTION OF THE INVENTION

Hydrogen Swellable Materials

Figure 1:
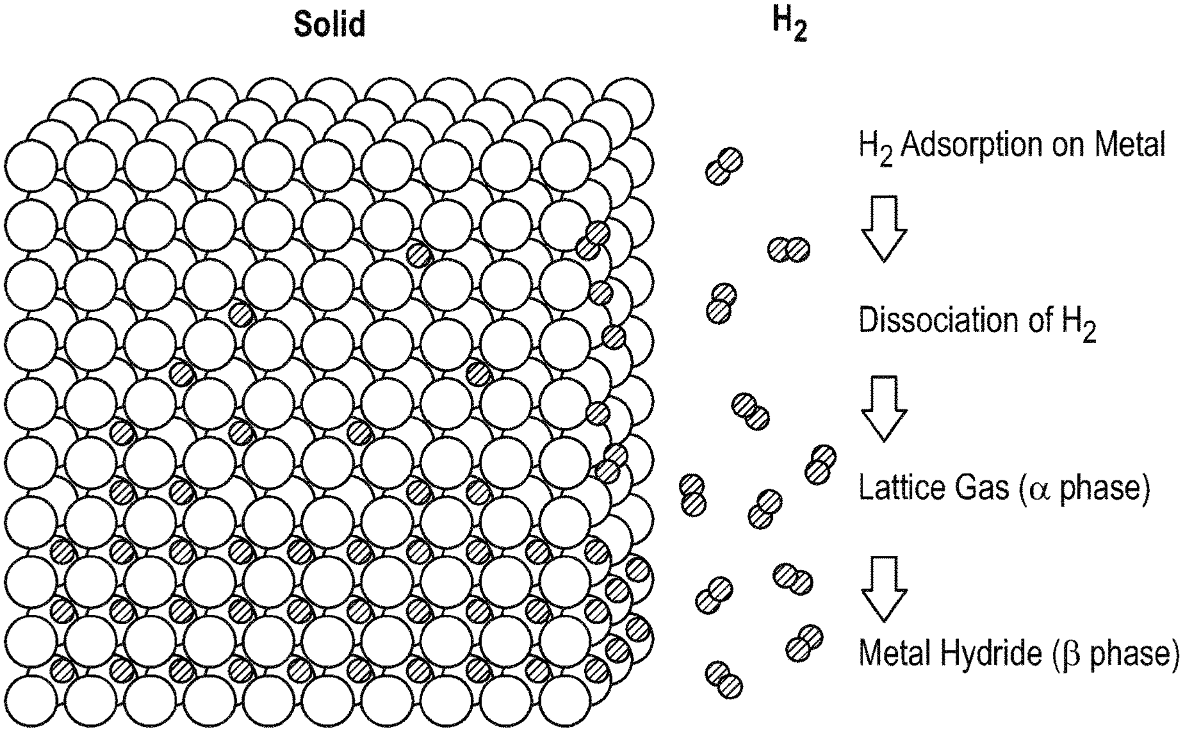
FIG. 1 depicts an exemplary mechanism for metal hydride formation, as described in embodiments herein.

The base material for the hydrogen swellable materials described herein may be selected from any suitable material known in the industry for forming seals. Preferably, the base material is a polymer. More preferably, the base material is an elastomer. In an embodiment, elastomers can refer to substances emulating natural rubber in that they stretch under tension, have a high tensile strength, retract rapidly, and substantially recover their original dimensions. Elastomers can include natural and man-made elastomers, and the elastomer may be a thermoplastic elastomer or a non-thermoplastic elastomer. The term includes blends (physical mixtures) of elastomers, as well as copolymers, terpolymers, and multi-polymers.

Elastomers that are useful in the present invention include, but are not limited to, polybutadiene (BR), styrene-butadiene rubber (SBR), isobutene-isoprene rubber (IIR), neoprene (e.g., neoprene 50A, neoprene 70A), chloroprene rubber (CR), nitrile rubber (NBR), ethylene propylene diene monomer rubber (EPDM), silicone rubbers, such as vinyl-methyl-silicone (VMQ), hydrogenated nitrile rubber (HNBR), carboxylated nitrile rubber (XNBR), carboxylated hydrogenated nitrile rubber (XHNBR), silicone rubber, ethylene-propylene-diene copolymer (EPDM), fluoroelastomer (FKM, FEPM) and perfluoroelastomer (FFKM), and any mixture or blends of any of the foregoing.

In certain embodiments, the elastomer is selected from neoprene, FKM, FEPM, FFKM, NBR, HNBR, XNBR, XNHBR, or any combination thereof.

In certain embodiments, any of the hydrogen swellable materials described herein comprise about 100 parts per hundred of rubber (phr) of elastomer. In certain embodiments, any of the hydrogen swellable materials described herein comprise 100 parts per hundred of rubber (phr) of elastomer.

In certain embodiments, any of the hydrogen swellable materials described herein further comprises a filler (e.g., a reinforcing filler). Suitable fillers that may be used include, but are not limited to, carbon black, minerals (e.g., silica), graphene, carbon nanotubes, clay, or any combination thereof.

In certain embodiments, the filler is present in an amount of between about 25 to about 100 phr, such as between about 25 to about 80 phr or between about 40 to about 70 phr.

In further embodiments, any of the hydrogen swellable materials described herein further comprises one or more of (i) vulcanizing agents (such as sulfur or peroxide, about 0.5 to about 40 phr), (ii) accelerators (such as hexamine, mercapto-N-cyclohexyl, benzothiazole sulfenamide, sodium diethyl dithiocarbamate, tetramethylthiuram disulfide, tetramethylthiuram monosulfide, triallyl isocyanurate, triallyl cyanurate, about 0.5 to about 5 phr), (iii) activators (such as zinc oxide, zinc stearate, about 1 to about 5 phr), (iv) antioxidants (such as amine and phenolic based antioxidants, about 0.5 to about 2 phr), and (v) processing oils (such as paraffin waxes, petroleum resins, coumarone resins, high styrene resins, phenolic resins, about 0 to about 25 phr), or any combination of any of the foregoing.

In additional embodiments, the hydrogen swellable materials according to any embodiment described herein further comprises one or more metals (including lanthanides), either a solid solution (e.g., a homogeneous mixture of two different kinds of atoms in the solid state and having a single-crystal structure) or an intermetallic compound, that is capable of absorbing hydrogen to form a metal hydride compound, thereby enhancing the hydrogen absorption of the hydrogen swellable materials described herein. Simplistically, this may be characterized as a metal reacting with hydrogen gas as follows:

$$M + x/2\, H_2 \leftrightarrow MH_x + Q$$

wherein M is one or more metals, $MH_x$ is the corresponding hydride, x is the ratio of hydrogen to metal, and Q is the heat of reaction. Q is exothermic, meaning some heat is released. The heat released may be used to assist other physical phenomena. For example, when added to an elastomer, the resulting heat release by formation of the metal hydride may thermally promote hydrogen diffusion through the surrounding elastomer. FIG. 1 depicts an exemplary mechanism for metal hydride formation, involving $H_2$ adsorption on a metal, dissociation of $H_2$, lattice gas (α phase) and metal hydride (β phase) formation.

Suitable metals (M) that may be used include, but are not limited to, lithium (Li), sodium (Na), potassium (K), rubidium (Rb), cesium (Cs), magnesium (Mg), calcium (Ca), strontium (Sr), barium (Ba), scandium (Sc), iron (Fe), yttrium (Y), lutetium (Lu), titanium (Ti), zirconium (Zr), hafnium (Hf), vanadium (V), niobium (Nb), tantalum (Ta), lanthanum (La), cerium (Ce), praseodymium (Pr), neodymium (Nd), samarium (Sm), gadolinium (Gd), terbium (Tb), dysprosium (Dy), holmium (Ho), erbium (Er), Thulium (Tm), ytterbium (Yb), thorium (Th), protactinium (Pa), uranium (U), neptunium (Np), plutonium (Pu), americium (Am), or any combination of any of the foregoing.

Some examples of intermetallic species that may form intermetallic hydrides are shown in the table below.

| COMPOSITION | A | B | COMPOUNDS |
|---|---|---|---|
| $A_2B$ | Mg, Zr | Ni, Fe, Co | $Mg_2Ni$, $Mg_2Co$, $Zr_2Fe$ |
| AB | Ti, Zr | Ni, Fe | TiNi, TiFe, ZrNi |
| $AB_2$ | Zr, Ti, Y, La | V, Cr, Mn, Fe, Ni | $LaNi_2$, $YNi_2$, $YMn_2$, $ZrCr_2$, $ZrMn_2$, $ZrV_2$, |

-continued

| COMPOSITION | A | B | COMPOUNDS |
|---|---|---|---|
| | | | $TiMn_2$ |
| $AB_3$ | La, Y, Mg | Ni, Co | $LaCo_2$, $YNi_3$, $LaMg_2Ni_9$ |
| $AB_5$ | Ca, La, Rare Earth | Ni, Cu, Co, Pt, Fe | $CaNi_5$, $LaNi_5$, $CeNi_5$, $LaCu_5$, $LaPt_5$, $LaFe_5$ |

In additional embodiments, any of the hydrogen swellable materials described herein has a gravimetric density of between about 0.9 and about 3 wt. % hydrogen, such as between about 1.5 and about 3 wt. % hydrogen.

In additional embodiments, any of the hydrogen swellable materials described herein has a volumetric density of between about 0.9 and about 3 kg $H_2/m^3$, such as between about 1.5 and about 3 kg $H_2/m^3$.

In additional embodiments, any of the hydrogen swellable materials described herein may further comprises one or more metallic permethylpentalane compounds. See, e.g., Fraser et al., *Inorg. Chem.,* 61, 12207-12218, 2022. which is incorporated by reference in its entirety.

In an embodiment of any of the hydrogen swellable materials described herein, the elastomer has a hardness of between about 40 and about 80 shore A, such as between about 50 and about 80 shore A, or between about 60 and about 80 shore A.

In an embodiment of any of the hydrogen swellable materials described herein, the elastomer has a hardness of less than about 80 shore A, such as less than about 70 shore A, less than about 60 Shore A, or less than about 50 shore A. Hardness may be measured, for example, using a shore durometer tool.

In an embodiment, any of the hydrogen swellable materials described herein swells (i.e., increases in volume) by between about 40% and about 100%, such as between about 50% and about 100%, between about 60% and about 100%, between about 70% and about 100%, between about 80% and about 100%, between about 90% and about 100%, or between about 95% and about 100%.

In an embodiment, any of the hydrogen swellable materials described herein swells (i.e., increases in volume) by between about 40% and about 100%, such as between about 50% and about 100%, between about 60% and about 100%, between about 70% and about 100%, between about 80% and about 100%, between about 90% and about 100%, or between about 95% and about 100%, for example, when in contact with hydrogen at partial hydrogen pressures between about 35 MPa and about 100 MPa, such as between about 40 MPa and about 100 MPa, between about 50 MPa and about 100 MPa, between about 60 MPa and about 100 MPa, between about 70 MPa and about 100 MPa, between about 80 MPa and about 100 MPa, between about 90 MPa and about 100 MPa, or between about 95 MPa and about 100 MPa.

In an embodiment, the hydrogen swellable materials described herein swell reversibly (e.g., the mechanism of swelling by adsorption and diffusion allows desorption and shrinkage). In other embodiments, the hydrogen swellable materials described herein swell irreversibly (e.g., the mechanism of swelling by adsorption and diffusion does not allow desorption and shrinkage). In yet further embodiments, some parts of the hydrogen swellable materials described herein swells reversibly and other parts of the hydrogen swellable materials described herein swells irreversibly. Without wishing to be bound by theory, the inventors theorize that presence of the filler may offset the reversible swelling of the hydrogen swellable material, making the swelling more irreversible. The filler may also aid in helping to increase the amount of swelling.

In certain embodiments, swelling of any of the hydrogen swellable materials described herein is triggered by a change in the temperature (e.g., a well temperature) a change in the pressure (e.g., a well pressure), or a combination thereof. In certain embodiments, swelling of any of the hydrogen swellable materials described herein is triggered when the temperature reaches about 200° F., such as about 250° F., about 300° F. or about 350° F. In additional embodiments, swelling of any of the hydrogen swellable materials described herein is triggered when the pressure reaches greater than about 250 MPa, such as about 275 MPa, about 290 MPa, or about 300 MPa.

In certain embodiments, any of the hydrogen swellable materials described herein comprises particles (such as round, angular, linear, irregular). In certain embodiments, the particles have a particle size of between about 10 microns and about 10,000 microns, such as between about 50 microns and about 5,000 microns, or between about 100 microns and about 5,000 microns.

Manufacturing the Hydrogen Swellable Materials

The hydrogen swellable materials described herein may be readily made using conventional rubber mixing techniques e.g., using an internal rubber mixer (such as mixers manufactured by Banburry) and/or a twin roll mill (such as mills manufactured by PPlast).

The present invention also relates to cements containing one or more of the hydrogen swellable materials as described in any embodiment herein.

In some examples, the cement is a Portland cement or a mixture of slag and Portland cement. Further examples include Portland cement blends, such as Portland blast furnace cement, Portland fly ash cement, Portland pozzolan cement, Portland silica fume cement. The cement may also be masonry cements, expansive cements, white blended cements and very finely ground cements and mixtures thereof. In addition, non-Portland hydraulic cements may also be used, such as Pozzolan-lime cements, slag-lime cements, supersulfated cements, calcium aluminate cements, calcium sulfoaluminate cements and geopolymer cements.

In certain embodiments, the cement contains between about 1 and about 30 wt. % of the hydrogen swellable material, such as between about 1 and about 5 wt. %, between about 5 and about 10 wt. %, between about 1 and about 15 wt. %, between about 15 and about 20 wt. %, between about 20 and about 25 wt. %, or between about 25 and about 30 wt. % of the hydrogen swellable material.

Figure 2:
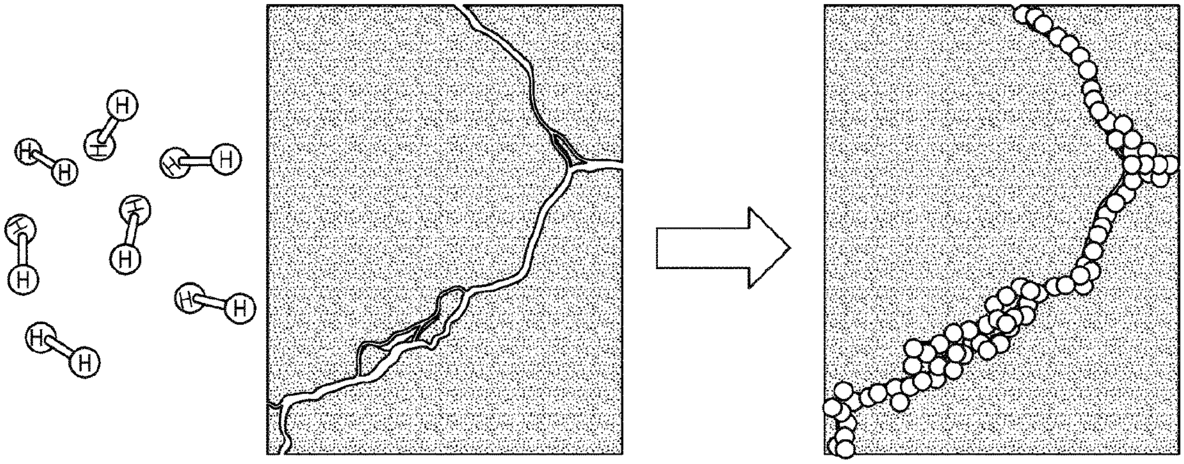
FIG. 2 is an exemplary schematic showing a self-healing cement containing a hydrogen swellable material according to any embodiment described herein.

FIG. 2 depicts an exemplary self-reparable cement containing a hydrogen swellable material according to any of the embodiment described herein (left hand: hydrogen, middle: cracked cement, right hand: repaired cement containing the hydrogen swellable material).

Figure 3:
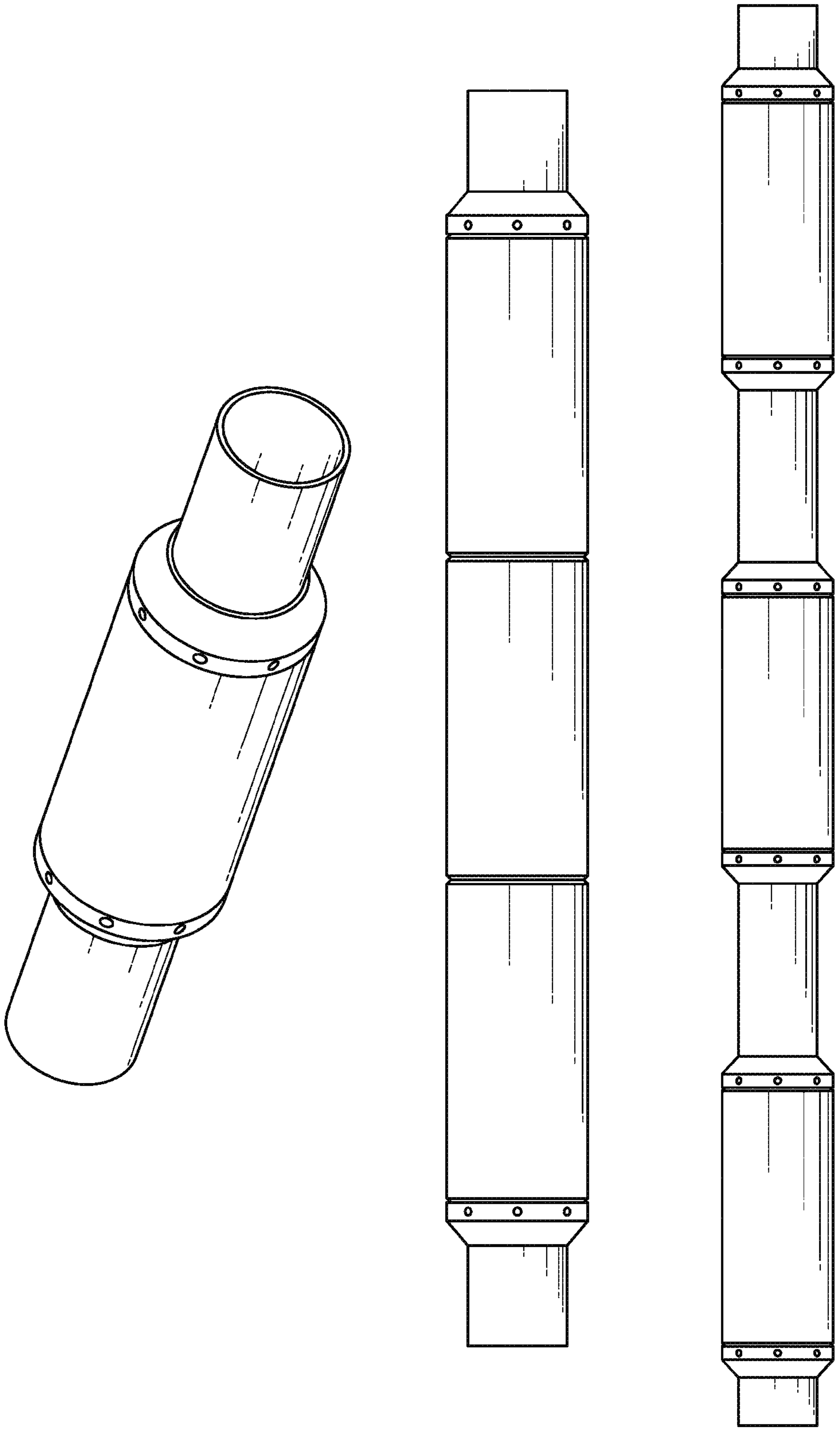
FIG. 3 depicts an exemplary swellable slip packer, designed to swell on contact with hydrogen to seal the annulus around the pipe in both open hole and cased hole wells.

FIG. 3 depicts an exemplary swellable slip packer, designed to swell on contact with hydrogen to seal the annulus around the pipe in a well (top: single element, middle: multiple elements, bottom: spaced elements). The slip packer slips onto the completion tubular and is anchored with locking gauge rings. Depending upon the well fluid composition, particularly hydrogen percentage, the rate of swelling will vary for different swellable materials. More hydrogen should lead to a faster response. The slip packer is shown in an open-hole scenario providing long-term annular isolation to prevent unwanted fluids around it. The packer swells over time in the presence of hydrogen and provide a seal against an irregular open-hole. For example, in one embodiment, the packer is constructed out of reactive materials run in the well in an unswollen state and once in position the materials are set free to expand. The elastomeric elements may be permanently bonded to a mandrel part of the well completion. While FIG. 3 shows an open-hole application, such packers may also be used in cased-hole applications to provide outer-tubing or annular zonal isolation against other well equipment surfaces.

EXAMPLES

Example 1: Preparation of Hydrogen Swellable Materials

An exemplary process for the preparation of the hydrogen swellable materials described herein is provided below:

1) Virgin rubber (e.g., nitrile rubber) (100 phr) is added to an internal mixer and mixed at 100 rpm for 5 minutes at 120° C.
2) Reinforcing filler(s) and additional ingredients are added to the internal mixer and mixed at 100 rpm for 15 minutes to ensure good dispersion. The temperature increase and mixing torque are monitored.
3) Curing agent(s) are added to the internal mixer and mixed at 100 rpm for 10 minutes. The temperature increase and mixing torque are monitored.
4) The sample is removed from the internal mixer and an after-mix is performed using a two-roll mixer (80° C.) to preform milled sheet rubber.
5) The milled sheet rubber is further cured (200° C.) for 15 minutes.
6) The cured sheet is cut into a desired shape.

Example 2: Hydrogen Cyclic Testing

Hydrogen cyclic testing was performed on various elastomers in accordance with ISO 23936-2:2011 (Petroleum, petrochemical and natural gas industries—Non-metallic materials in contact with media related to oil and gas production—Part 2: Elastomers).

Test Parameters

Elastomers Studied: Silicone 70A Bead, Buna-N 70A Bead, Neoprene 70A Bead, Viton 70A Bead, PU 80A Bead, EPDM Strip 60A, Neoprene Strip 50A, Buna-N Strip 60A, Buna-N Strip 40A (other elastomers described herein are expected to swell in a similar manner);

Test Temperature: 100° C. (212° F.);

Media: 100% hydrogen;

Pressure: 150 bar;

Release: 20 bar/min.;

Full Scale Eight Cycles.

a) Place test elastomer in the test vessel and close it;
b) Charge the vessel with nitrogen to 1 MPa minimum and check for leaks. Release the nitrogen;
c) Heat the vessel to test temperature (100° C.);
d) Once the temperature has stabilized at the test level for at least 15 minutes, charge the vessel with the test gas (100% $H_2$) to the test pressure. The temperature and pressure should be recorded continuously. A sampling interval of 10 minutes is recommended. This should be reduced to 30 seconds for depressurization and pressurization operations;
e) Maintain the test pressure and temperature for a minimum period of 68 hours (cycle 0);
f) Depressurize the vessel and hold at ambient pressure and test temperature for 60 minutes (+10/−0 minutes, i.e., between 60 and 70 minutes) (cycle 1);
g) Re-pressurize the vessel to test pressure and hold for a minimum of 6 hours; h) Repeat step (f) (cycle 2);
i) Re-pressurize the vessel to test pressure and hold for a minimum of 12 hours;
j) Repeat step (f) (cycle 3);
k) Repeat step (g);
l) Repeat step (f) (cycle 4);
m) Repeat step (i);
n) Repeat step (f) (cycle 5);
o) Repeat step (g);
p) Repeat step (f) (cycle 6);
q) Repeat step (i);
r) Repeat step (f) (cycle 7);
s) Repeat step (g);
t) Depressurize the vessel and hold at ambient pressure and test temperature for a minimum period of 12 hours with port/valve open (cycle 8);
u) Cool the vessel to room temperature;
v) Open the vessel;
w) Check volume changes with times.

Figure 4:
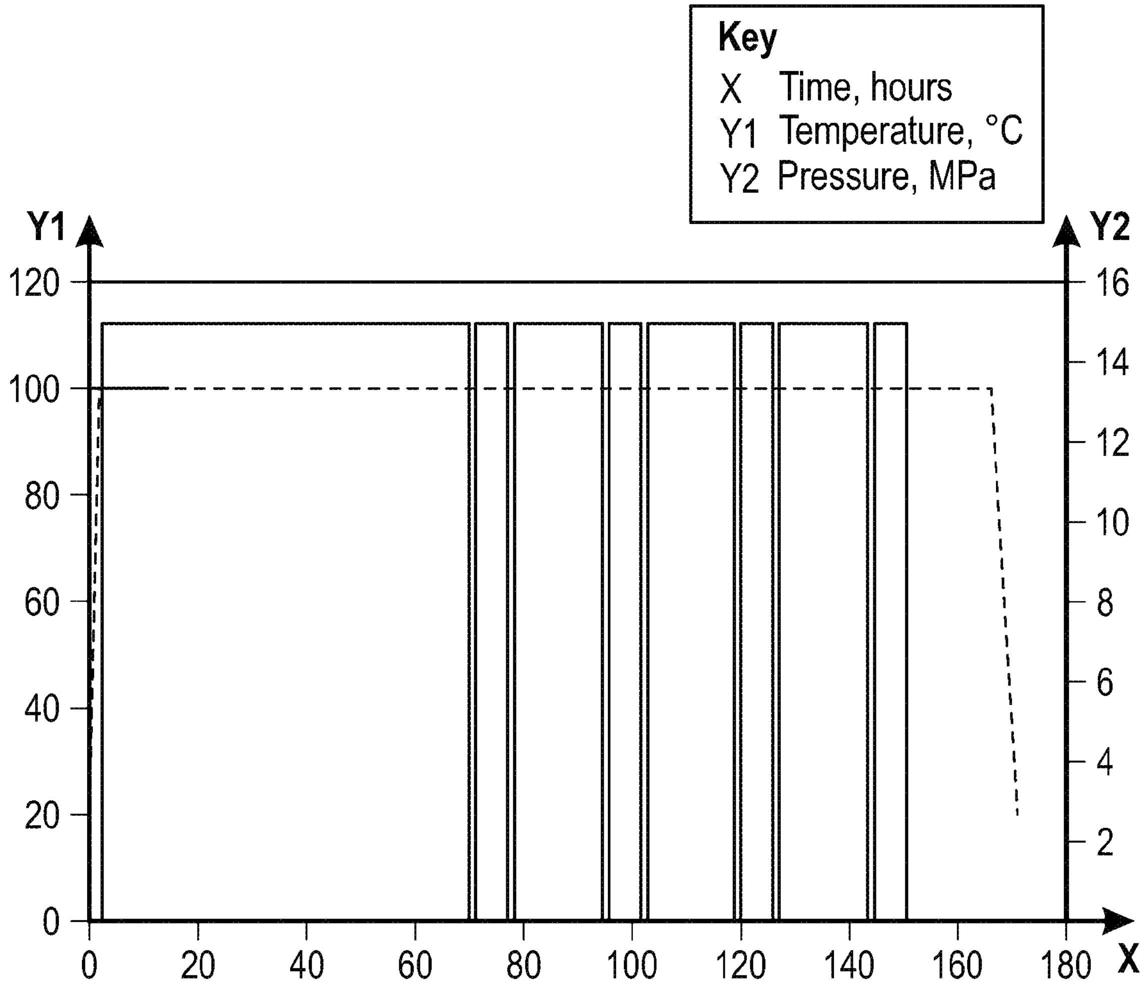
FIG. 4 is a schematic of pressure (solid line) and temperature (dashed line) versus time requirements for the standard eight cycle rapid gas decompressions (RGD) test described in Example 2.

FIG. 4 is a schematic of pressure (solid line) and temperature (dashed line) versus time requirements for the standard eight cycle RGD test.

Figure 5:
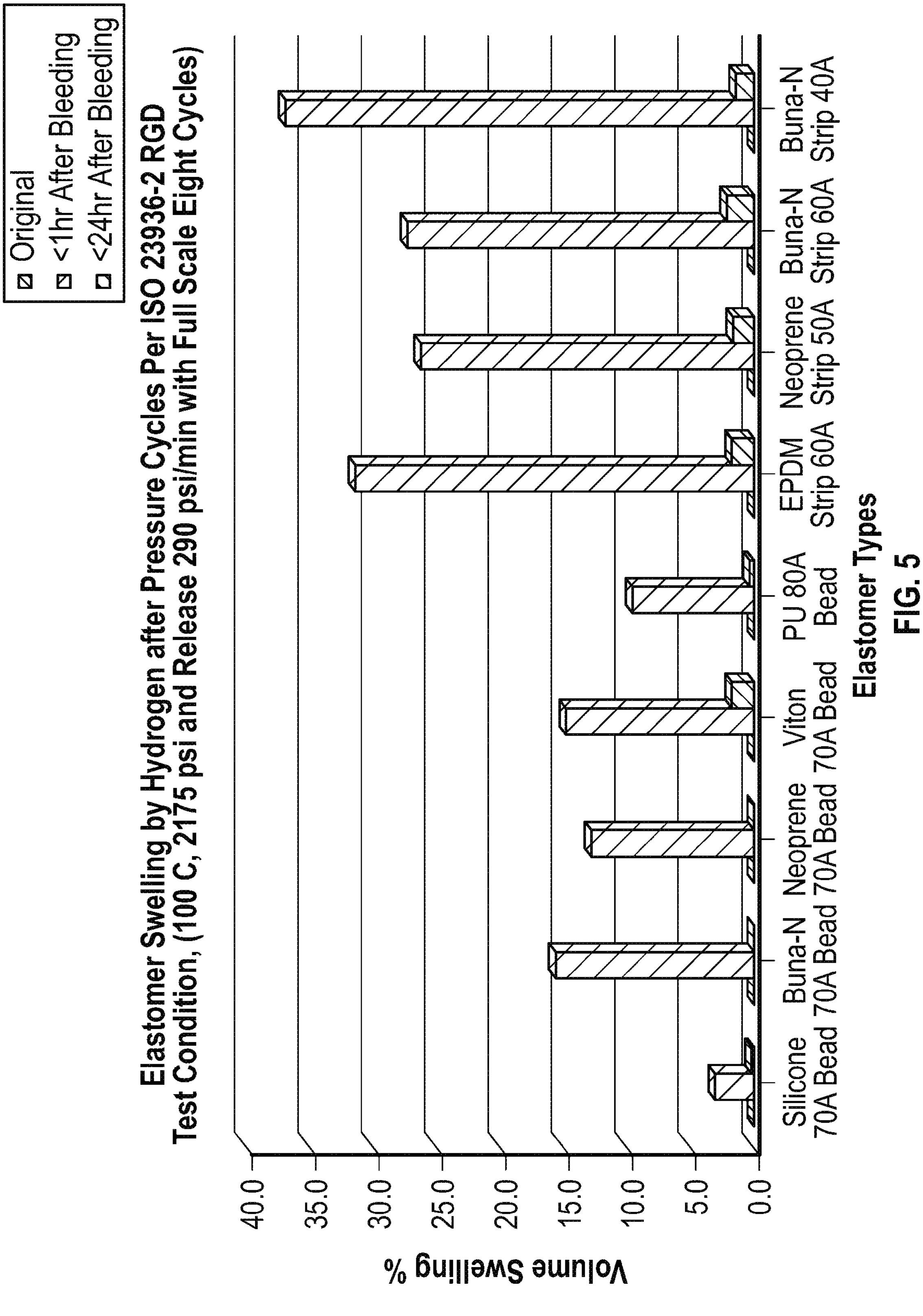
FIG. 5 shows the percentage increase in volume swelling for each of the elastomers tested in Example 2 (left hand column: original; middle column: less than 1 hour after bleeding; right hand column: 24 hours after bleeding).

FIG. 5 shows the percentage increase in volume swelling for each of the elastomers tested (left hand column: original, middle column: less than 1 hour after bleeding, right hand column: 24 hours after bleeding.

The description of the present embodiments of the invention has been presented for purposes of illustration but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention.

What is claimed is:

1. A hydrogen swellable material comprising:
(i) an elastomer;
(ii) a filler; and
(iii) an intermetallic compound,
wherein the elastomer has a hardness between about 40 and about 80 shore A,
wherein the hydrogen swellable material swells in volume between about 40% and about 100% upon contact with hydrogen at partial hydrogen pressures between about 35 MPa and about 100 MPa,
wherein the intermetallic compound is capable of absorbing hydrogen to form a metal hydride compound, and
wherein the hydrogen swellable material has a gravimetric density of between about 0.9 wt. % and about 3 wt. % hydrogen and a volumetric density of between about 0.9 kg $H_2/m^3$ and about 3 kg $H_2/m^3$.

2. The hydrogen swellable material of claim 1, wherein the elastomer is selected from polybutadiene (BR), styrene-butadiene rubber (SBR), isobutene-isoprene rubber (IIR), chloroprene rubber (CR), nitrile rubber (NBR), ethylene propylene diene monomer rubber (EPDM), silicone rubbers, vinyl-methyl-silicone (VMQ), hydrogenated nitrile rubber (HNBR), carboxylated nitrile rubber (XNBR), carboxylated hydrogenated nitrile rubber (XHNBR), ethylene-propylene-diene copolymer (EPDM), fluoroelastomer (FKM, FEPM) and perfluoroelastomer (FFKM), and any mixture or blend of any of the foregoing.

3. The hydrogen swellable material of claim 1, wherein the filler is carbon black, a mineral, graphene, carbon nanotubes, clay, or any combination thereof.

4. The hydrogen swellable material of claim 1, wherein the elastomer is present in an amount of about 100 phr.

5. The hydrogen swellable material of claim 1, wherein the filler is present in an amount of between about 25 phr and about 100 phr.

6. The hydrogen swellable material of claim 1, wherein the material further comprises one or more of (i) vulcanizing agents, (ii) accelerators, (iii) activators, (iv) antioxidants, (v) processing oils, or any combination of any of the foregoing.

7. The hydrogen swellable material of claim 1, wherein the hydrogen swellable material swells in volume by between about 40% and about 100%.

8. The hydrogen swellable material of claim 1, wherein the hydrogen swellable material further comprises particles.

9. The hydrogen swellable material of claim 8, wherein the particles have a particle size of between about 1 nanometer and about 100 microns.

10. A sealing system comprising a hydrogen swellable material according to claim 1.

11. A method for forming a seal, the method comprising (i) providing a hydrogen swellable material according to claim 1;

(ii) deploying the hydrogen swellable material into a wellbore; and (iii) exposing the hydrogen swellable material to hydrogen, thereby forming a seal in the wellbore.

12. The method of claim 11, wherein the hydrogen swellable material is exposed to a swelling triggering condition, thereby forming a seal in the wellbore.

13. The method of claim 11, wherein the seal isolates a particular wellbore zone from another wellbore zone or region of a subterranean formation.

14. The method of claim 11, wherein the seal formed is an O-ring, a packer element, a bonded seal, a flow control valve, or a bridge plug.

15. The hydrogen swellable material of claim 1 further comprising one or more metallic permethylpentalane compounds.

16. A hydrogen swellable material comprising:

(i) an elastomer;

(ii) a filler;

(iii) an intermetallic compound; and (iv) particles, wherein the elastomer is selected from nitrile rubber (NBR), hydrogenated nitrile rubber (HNBR), carboxylated nitrile rubber (XNBR), carboxylated hydrogenated nitrile rubber (XHNBR), and any mixture or blend of any of the foregoing, wherein the elastomer is present in an amount of about 100 phr and has a hardness between about 40 and about 80 shore A, wherein the filler comprises carbon black and is present in an amount of between about 25 to about 100 phr, wherein the particles have a particle size of between about 1 nanometer and about 100 microns, wherein the hydrogen swellable material swells in volume between about 40% and about 100% upon contact with hydrogen at partial hydrogen pressures between about 35 MPa and about 100 MPa, wherein the intermetallic compound is capable of absorbing hydrogen to form a metal hydride compound, wherein the intermetallic compound comprises at least one of $LaNi_5$, TiFe, or ZrNi, and wherein the hydrogen swellable material has a gravimetric density of between about 0.9 wt. % and about 3 wt. % hydrogen and a volumetric density of between about 0.9 kg $H_2/m^3$ and about 3 kg $H_2/m^3$.

17. The hydrogen swellable material of claim 16, wherein the elastomer is HNBR.

18. The hydrogen swellable material of claim 16, wherein the intermetallic compound comprises $LaNi_5$.

19. The hydrogen swellable material of claim 16, wherein the hydrogen swellable material further comprises one or more metallic permethylpentalane compounds.

* * * * *